United States Patent
Scott et al.

(10) Patent No.: US 7,660,853 B2
(45) Date of Patent: Feb. 9, 2010

(54) HASHING ALGORITHM USED FOR MULTIPLE FILES HAVING IDENTICAL CONTENT AND FINGERPRINT IN A PEER-TO-PEER NETWORK

(75) Inventors: Adrian C. H. Scott, San Francisco, CA (US); S. Mitra Ardron, Fairfax, CA (US)

(73) Assignee: Qurio Holdings, Inc., Raleigh, NC (US)

( * ) Notice: Subject to any disclaimer, the term of this patent is extended or adjusted under 35 U.S.C. 154(b) by 342 days.

(21) Appl. No.: 11/364,465

(22) Filed: Feb. 28, 2006

(65) Prior Publication Data

US 2006/0149806 A1 Jul. 6, 2006

Related U.S. Application Data

(62) Division of application No. 09/883,064, filed on Jun. 15, 2001, now abandoned.

(60) Provisional application No. 60/212,177, filed on Jun. 16, 2000.

(51) Int. Cl.
  *G06F 15/16* (2006.01)
  *G06F 15/173* (2006.01)
  *G06F 15/177* (2006.01)
(52) U.S. Cl. ............................ 709/205; 709/217; 707/2
(58) Field of Classification Search ......... 709/200–205, 709/217–229; 707/2
  See application file for complete search history.

(56) References Cited

U.S. PATENT DOCUMENTS

| | | | | |
|---|---|---|---|---|
| 5,862,335 A | * | 1/1999 | Welch et al. ................. 709/224 |
| 5,978,791 A | * | 11/1999 | Farber et al. ................... 707/2 |
| 6,225,888 B1 | | 5/2001 | Juopperi ..................... 340/5.8 |
| 6,374,266 B1 | * | 4/2002 | Shnelvar ..................... 707/204 |
| 6,415,280 B1 | * | 7/2002 | Farber et al. ................... 707/2 |
| 7,430,587 B2 | * | 9/2008 | Malone et al. .............. 709/217 |
| 2001/0037311 A1 | * | 11/2001 | McCoy et al. ................. 705/65 |
| 2002/0038348 A1 | * | 3/2002 | Malone et al. .............. 709/217 |
| 2002/0052884 A1 | * | 5/2002 | Farber et al. ............. 707/104.1 |
| 2002/0101989 A1 | | 8/2002 | Markandey et al. ......... 380/210 |
| 2002/0143944 A1 | * | 10/2002 | Traversat et al. ............ 709/225 |
| 2005/0114296 A1 | * | 5/2005 | Farber et al. ................... 707/1 |
| 2005/0172010 A1 | * | 8/2005 | Malone et al. .............. 709/219 |

OTHER PUBLICATIONS

D. Eastlake et al., "US Secure Hash Algorithm 1 (SHA1)," (memo), Sep. 2001, 1 page, http://www.faqs.org/rfcs/rfc3174.html.

* cited by examiner

*Primary Examiner*—Haresh N Patel
(74) *Attorney, Agent, or Firm*—Withrow & Terranova, PLLC

(57) ABSTRACT

The present invention provides an improved technique for accessing information in a peer-to-peer network. According to specific embodiments of the present invention, each file accessible in the peer-to-peer network is assigned a respective hash ID or fingerprint ID which is used to describe the contents of that file. Files in the peer-to-peer network may be identified and/or accessed based upon their associated hash ID values. In this way it is possible to identify identical files stored in the peer-to-peer network which have different file names and/or other metadata descriptors. Since the content of all files having the same hash ID will be identical, an automated process may be used to retrieve the desired content from one or more of the identified files.

15 Claims, 19 Drawing Sheets

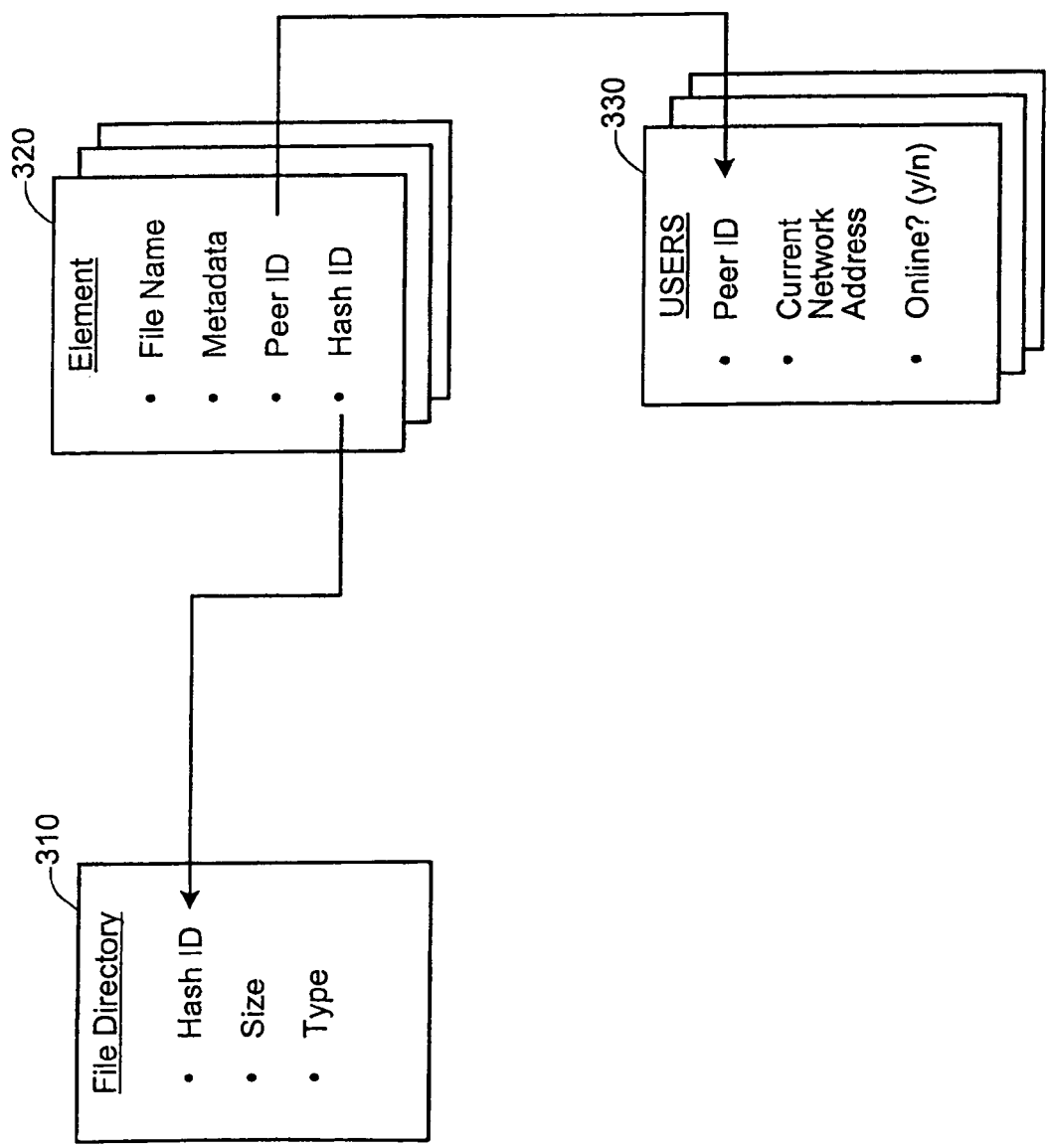

File Table

| FILE NAME 452 | HASH ID 454 | SIZE 456 | TYPE 457 | METADATA 458 | LOCATION 459 |
|---|---|---|---|---|---|
| File A | Hash Code A | n bytes | mp3 | | c:\my music |
| File B | Hash Code B | m bytes | jpeg | birthday picture | c:\my pics |
| File C | Hash Code C | p bytes | mpeg | graduation | c:\my vids |
| ... | | | | | |

450

451a → File A
451b → File B
451c → File C

Fig. 4A

Round-Robin Embodiment

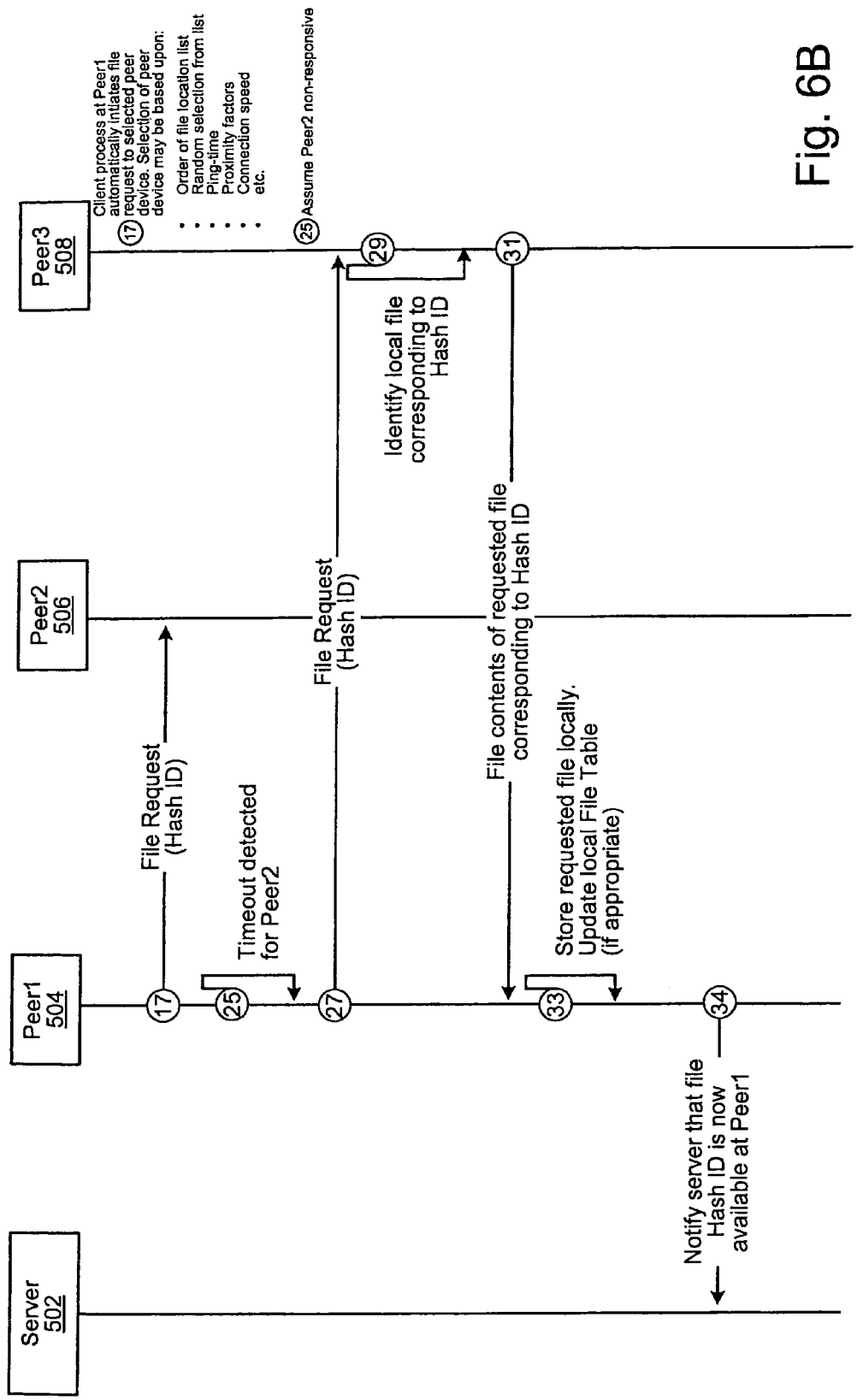

Round-Robin Embodiment

Fig. 8  Chunk Map for desired file. Maintained by Chunk Manager.

HASHING ALGORITHM USED FOR MULTIPLE FILES HAVING IDENTICAL CONTENT AND FINGERPRINT IN A PEER-TO-PEER NETWORK

RELATED APPLICATION DATA

This application is a divisional patent application of U.S. application Ser. No. 09/883,064, now abandoned, filed Jun. 15, 2001, entitled HASHING ALGORITHM USED FOR MULTIPLE FILES HAVING IDENTICAL CONTENT AND FINGERPRINT IN A PEER-TO-PEER NETWORK, which claims priority to U.S. Provisional Patent Application Ser. No. 60/212,177, filed Jun. 16, 2000, both of which are incorporated herein by reference in their entireties.

BACKGROUND OF THE INVENTION

Over the past decade, there has been an explosive growth in computer network technology, which has dramatically changed the degree and type of information available to users connected to computer networks, such as, for example, the Internet. As information becomes more accessible over local and wide area networks, new techniques for file storage and distribution are developed. Currently, most existing architectures for file distribution in a network environment utilize centralized file storage and transfer architecture, in which files are stored in central servers and accessed by individual distributed client programs. However, as the files increase in number and size, file storage and distribution from these central servers often becomes problematic.

One type of file sharing technology which addresses some of the problems posed by centralized file storage systems relates to distributed file storage systems, such as those implemented in peer-to-peer networks. As commonly known to one having ordinary skill in the art peer-to-peer networks may be used for implementing distributed file sharing systems wherein selected files stored on each peer network device may be made accessible to other peer network devices in the peer-to-peer network. Accordingly, peer-to-peer network architectures are highly scalable, since files may be retrieved from many locations rather than just one central location (e.g., a central server).

In recent years, there have been significant advances in peer-to-peer network technology, particularly with regard to the Internet. For example, peer-to-peer file sharing applications such as NAPSTER™ and GNUTELLA™ now provide the ability for Internet users to configure their computer systems to function as peer network devices in a peer-to-peer network implemented across the Internet. In this way, an Internet user is able to access desired files which are stored at the computer systems of other Internet users.

While this first generation peer-to-peer architecture solved some of the problems associated with centralized file storage, it also introduced new problems such as, for example, file access, reliability, speed, security, etc. For example, using peer-to-peer file sharing applications such as NAPSTER™, shared files in the peer-to-peer network were identified and retrieved based upon their file names. Thus, for example, if a name of a file were misspelled, there was no other way of identifying the file during a search. Additionally, if a peer which was currently involved in one or more file retrieval operations went offline, the file retrieval operations would fail. The requesting user then had to discard the partial file contents and pick a new peer to download from. Consequently, very large files were virtually impossible to retrieve since few peers remained online long enough to complete such a large transfer.

It will be appreciated that there are numerous issues relating to peer-to-peer network technology which remain to be resolved. Accordingly, continuous efforts are being undertaken to improve peer-to-peer networking technology in order to provide improved file storage, access, and distribution techniques implemented over a data network.

SUMMARY OF THE INVENTION

According to different embodiments of the present invention, methods, systems, and computer program products are disclosed for accessing information in a peer-to-peer network. The peer-to-peer network includes a plurality of peer devices and a database accessible by at least a portion of the peer devices. Each of the peer devices is configured to store information files, and is further configured to share content from selected information files with at least a portion of the other peer devices in the network. Each shared file in the network has a respective fingerprint IID associated therewith relating to its file content.

According to specific embodiments, files in the peer-to-peer network may be identified and/or accessed based upon their associated hash ID values. In this way it is possible to identify identical files stored in the peer-to-peer network which have different file names and/or other metadata descriptors. Additionally, since the content of all files having the same hash ID will be identical, an automated process may be used to retrieve the desired content from one or more of the identified files. For example, a user may elect to retrieve a desired file (having an associated hash ID) which may be stored at one or more remote locations in the peer-to-peer network. Rather than the user having to select a specific location for accessing and retrieving the desired file, an automated process may use the hash ID (associated with the desired file) to automatically select one or more remote locations for retrieving the desired file. According to different embodiments, the automated process may choose to retrieve the entire file contents of the desired file from a specific remote location, or may choose to receive selected portions of the file contents of the desired file from different remote locations in the peer-to-peer network. Further, if an error occurs during the file transfer process, resulting in a partial file transfer, the automated process may be configured to identify the portion(s) of the desired file which were not retrieve, and automatically select at least one different remote location for retrieving the remaining contents of the desired file.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 3A shows a block diagram of directory data structures in accordance with a specific embodiment of the present invention.

FIG. 4A shows a block diagram of an example of specific data stored in the peer directory structures in accordance with a specific embodiment of the present invention.

FIGS. 6A-6C illustrates a trace diagram of a file retrieving technique in accordance with a specific embodiment of the present invention.

DETAILED DESCRIPTION OF THE PREFERRED EMBODIMENTS

The present invention provides an improved technique for accessing information in a peer-to-peer network. According to specific embodiments of the present invention, each file accessible in the peer-to-peer network is assigned a respective hash ID or fingerprint ID which is used to describe the contents of that file. According to one embodiment, a conventional hash or fingerprinting algorithm may be used to analyze the contents of a selected file, and generate a unique hash ID or fingerprint ID which may be used for identifying the specific contents of that file. The hashing algorithm is designed such that no two files having different file content will have the same hash ID. However, files having identical file content will have the same hash ID. In one implementation, the file name and metadata associated with a file are not included in the computation of the hash ID for that file.

According to specific embodiments, files in the peer-to-peer network may be identified and/or accessed based upon their associated hash ID values. In this way it is possible to identify identical files stored in the peer-to-peer network which have different file names and/or other metadata descriptors. Additionally, since the content of all files having the same hash ID will be identical, an automated process may be used to retrieve the desired content from one or more of the identified files. For example, a user may elect to retrieve a desired file (having an associated hash ID) which may be stored at one or more remote locations in the peer-to-peer network. Rather than the user having to select a specific location for accessing and retrieving the desired file, an automated process may use the hash ID (associated with the desired file) to automatically select one or more remote locations for retrieving the desired file. According to different embodiments, the automated process may choose to retrieve the entire file contents of the desired file from a specific remote location, or may choose to receive selected portions of the file contents of the desired file from different remote locations in the peer-to-peer network. Further, if an error occurs during the file transfer process, resulting in a partial file transfer, the automated process may be configured to identify the portion(s) of the desired file which were not retrieve, and automatically select at least one different remote location for retrieving the remaining contents of the desired file.

Figure 1:
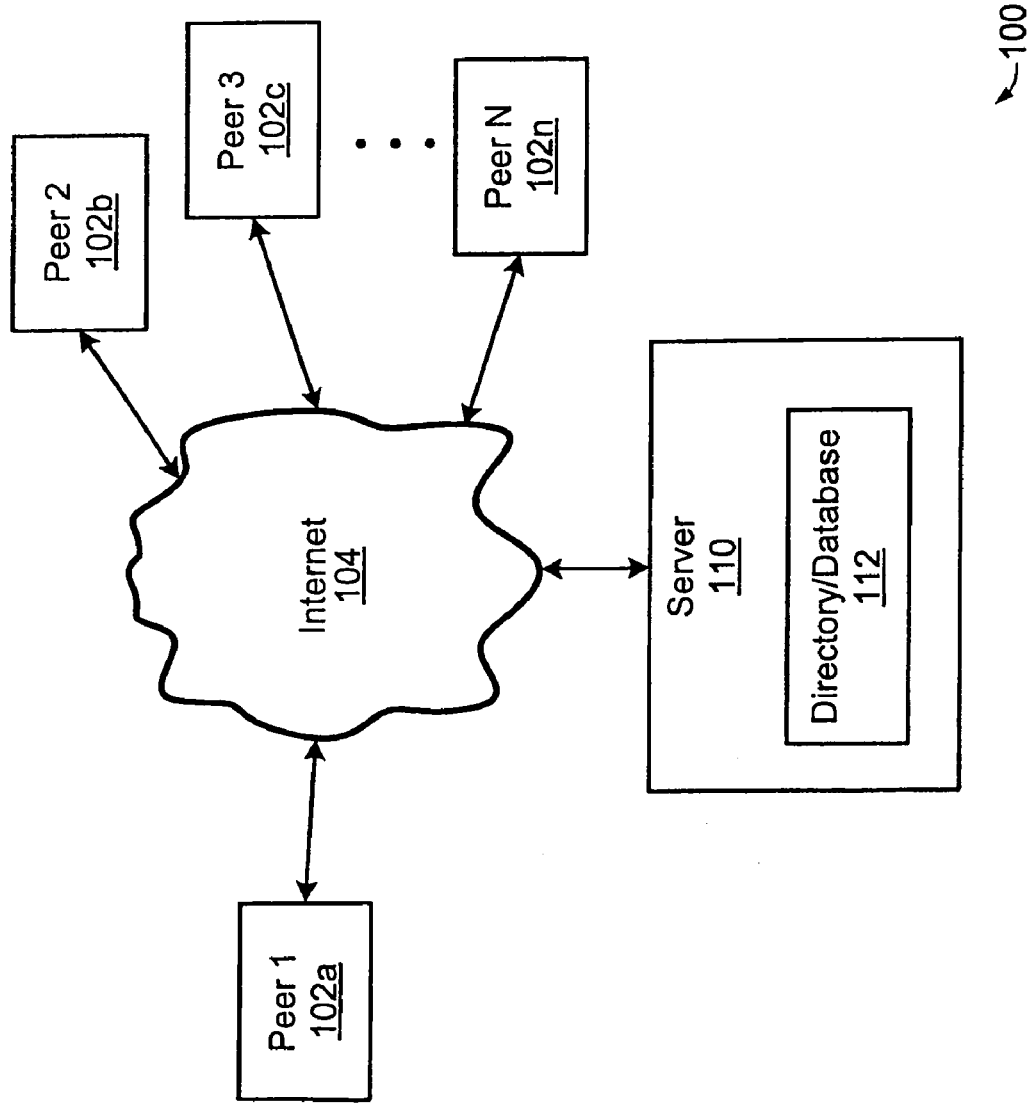
FIG. 1 illustrates a block diagram of peer-to-peer network which may be used for implementing the technique of the present invention in accordance with a specific embodiment of the present invention.

Referring now to FIG. 1, a high level view of a peer-to-peer network 100 is illustrated in accordance with a specific embodiment of the present invention. The network 100 includes a plurality of peer network devices 102a-102n, and at least one central server system 110. According to one specific implementation, the peer devices 102a-102n are communicably connected to each other and to the central server 110 via the Internet 104. The peers may communicate with each other and the server via the http protocol or via a private protocol, the former being preferable to minimize the effects of various firewalls that may exist between any given peer device and the Internet 104.

The server 110 preferably includes software or firmware that handles communication between the peer devices 102a-102n and the central server 110, and that performs specific logical operations on the directory 112 on the server. According to one specific implementation, the directory 112 may be stored in a single relational database, but permanent storage may also be accomplished by an object database, a directory server, or multiple databases.

Files 202 that are to be shared are only stored on the peer devices 102a-102n. The directory 112 stores information about the files (e.g., HASH ID, filename, metadata, size, type, etc.) but not their contents. In addition, the directory 112 stores information about the peer devices themselves (e.g., Peer ID) and most importantly, which peer devices the files 202 exist on at any given time.

Briefly, it will be appreciated that file 202 may contain any type of stored information. These include, for example, jpeg, mpeg and mp3.

Figure 2:
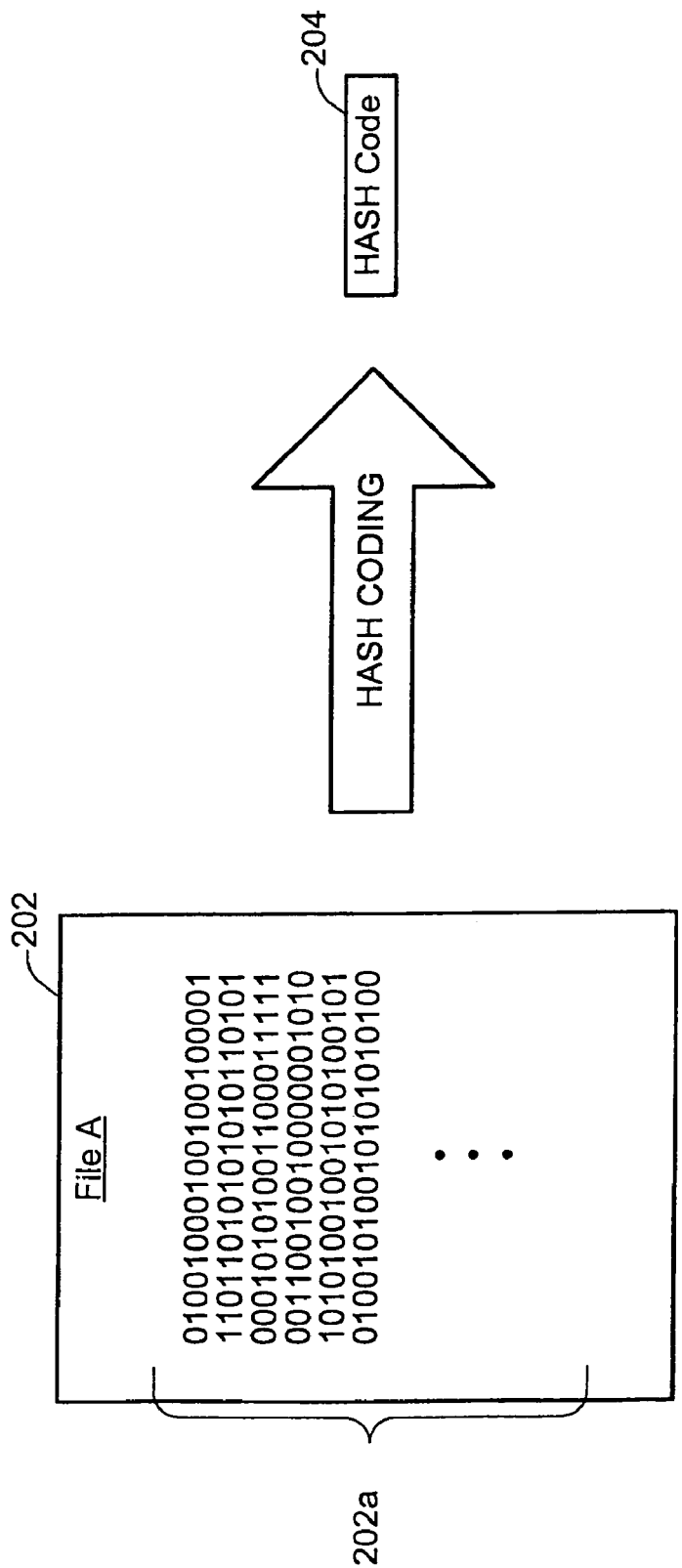
FIG. 2 shows a block diagram of HASH coding of a file in accordance with a specific embodiment of the present invention.

Turning now to FIG. 2, the unique footprinting of a file 202 is illustrated in accordance with one specific embodiment of the present invention. In particular, the process by which a file 202 may be uniquely identified is through the application of HASH code 204. Each peer device 102a-102n that wishes to publish a file on the peer-to-peer network 100 first computes the HASH code 204 of that file. The HASH code 204 may be computed via conventional algorithms which generate a unique identifier based upon the content of a particular file. Examples of fingerprinting or hash code algorithm which may be used in conjunction with the technique of the present invention include, MD5 (described in RFC 1321, and attached hereto has Appendix A of U.S. application Ser. No. 09/883,064), and Keyed SHA1 (described in RFC 2841, and attached hereto has Appendix B of U.S. application Ser. No. 09/883,064). Each of these references is incorporated herein by reference in its entirety for all purposes.

According to one specific implementation, MD5 (See Appendix A of U.S. application Ser. No. 09/883,064) may be used to guarantee that the HASH code is unique for each different file, even when two files differ by as little as one bit. Other algorithms may also be used such as, for example, Keyed SHA1 (See Appendix B of U.S. application Ser. No. 09/883,064) which mathematically characterizes the audio or visual waveforms of the content of the file and creates a unique code representation of that file. According to a specific embodiment, the filename, time/date stamps, and any other meta-data about the file are not included in the computation of the HASH code. Different peers, or even the same peer, can refer to or describe what is in fact the same file content by different names. The desired files are more likely to be found, as different users may search for files using different names, descriptions, or other characteristics, although the file content is identical. Such unique ID association allows each user to name and describe a given file in the manner most relevant to them.

According to one specific implementation, the central directory data 300 may be stored in a relational database. FIG. 3A illustrates three of the central tables in the directory data structures 300: the file directory table 310; the elements table 320; and the users table 330. The file directory table 310, for example, contains information about the file contents only, including the HASH code or ID, the size, and the type (video, music, image, etc . . . ). Other information specific to the contents of the file may also be stored in this table. The elements table 320, on the other hand, contains descriptive information or meta data about each file as entered and maintained by each individual user. This elements table 320 also includes foreign keys Hash code ID and Peer device ID that points to the files 310 and users tables 330, respectively. The users table 330 contains information about each user and his/her peer device 102a-102n. The users table also maintains the systems current knowledge as to which user is currently connected to the peer-to-peer network 100.

According to one specific embodiment, the relationship between the three tables of FIG. 3A can be defined such that each user can have many files and each file can be owned by many users. In addition, each user can have their own individual description of each file and may possibly describe the same file in more than one way, although the file content, and thus, the HASH coding are identical.

In one embodiment, should a file be deleted by every user that ever had them, there will be no record in the elements table 320 of that file but a record of that file's existence will remain in the file directory table 310.

Figure 3B:
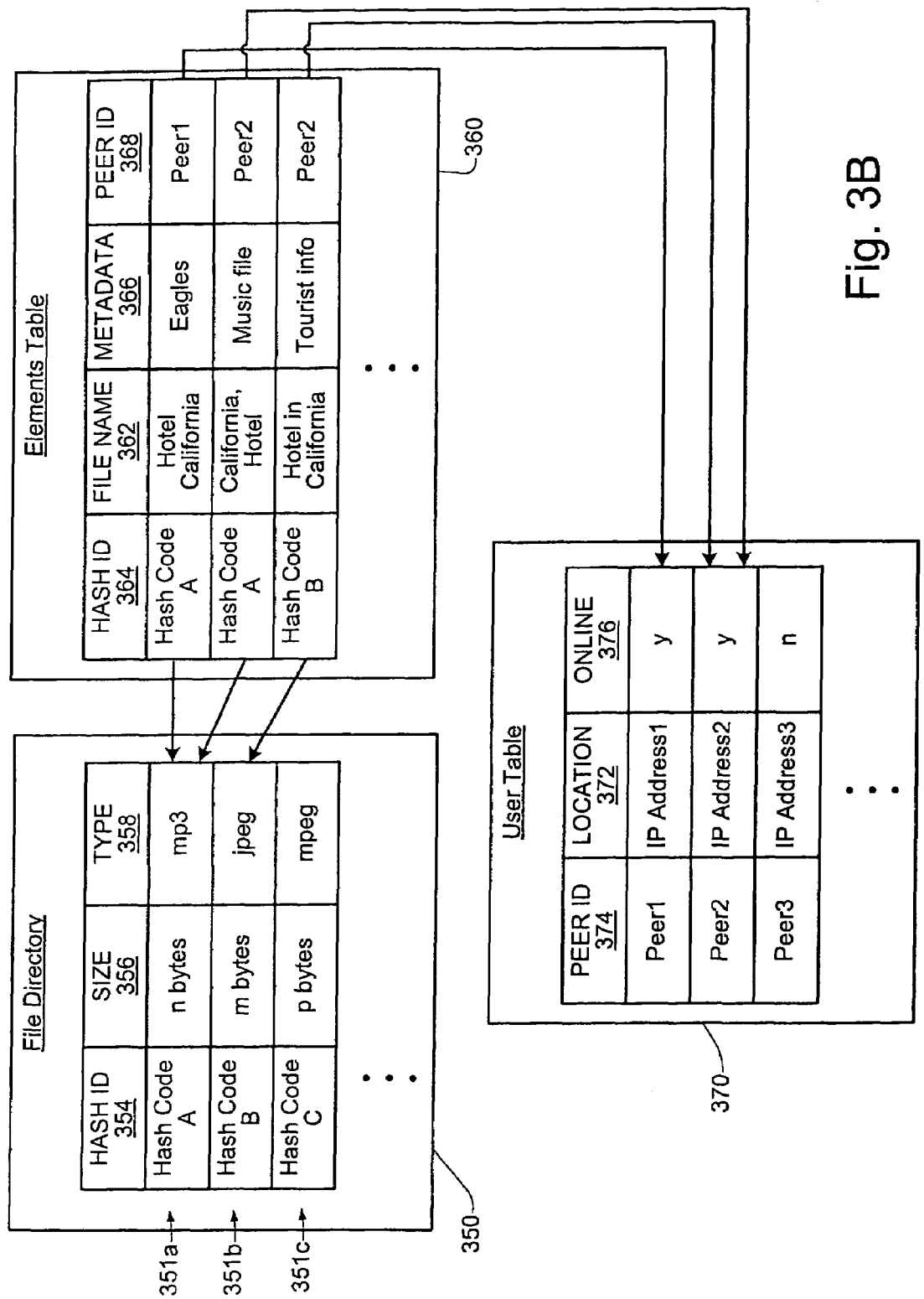
FIG. 3B shows a block diagram of an example of specific data stored in the directory data structures in accordance with a specific embodiment of the present invention.

As best viewed in FIG. 3B, a specific example is diagrammed which illustrates how a number of files, their descriptions, and the users that own them might be represented in the directory database 112. In file directory table 350, for instance, the HASH ID 354, the file size 356 and file type 358 are categorized and stored in the central server 110 for each particular file 351a-351c. Correspondingly, in the elements table 360, the HASH ID 364, the file name 362, the metadata 366 and the peer Id 368 are categorized and stored as well. Finally, in user table 370, the Peer ID 374, the address location 372 and the "online" determination, are categorized and stored on the server.

File 351a, for example, refers to a specific file whose HASH code is "A," whose length in "n" bytes, and whose type is "MP3." Two users, "Peer 1" and "Peer 2" each have a copy of this file 351a. Peer 1 has named file 351a as "Hotel California" in the file name 362 and described it as "Eagles" (in this case the name of the artist that recorded that song) in the metadata 366. Peer 2, in contrast, has named file 351a as "California, Hotel" in the file name 362 and described it simply as "Music File" in the metadata 366. Peer 1 and Peer 2 are both currently online, so that any other peer wishing to obtain either "Hotel California" or "California, Hotel," both of which ultimately have HASH code "A", will have two choices as to which machine to obtain it from.

Each peer 102a-102n in the peer-to-peer network 100 maintains their own local directory of what files (e.g., 451a-451c) it has available. In one particular embodiment, this directory may be stored as a local XML file for easy exchange with the server 110 over internet 104. FIG. 4A illustrates the contents of a local directory on a specific peer. The local file table 450 contains a record for each file 451a-451c. Each file may be described by its filename 452 (which may be subject to the constraints of the local operating system as to permitted characters, format, and length), a HASH ID 453, a file size 454, a file type 457, file meta data 458, and a location or folder path 459. The latter facilitates the peer device to quickly locate the file on the local disk when another peer device requests it.

Other files may be added to the local peer directory whenever the user drags them into one or more specific folders on the local machine. Files may also be deleted from the local directory when they are deleted from those folders or moved out of the specific directories. Alternative implementations may use different business rules and user interface processes to specify when a file becomes available for sharing.

To determine what files are available and where they may be available in the central directory 112 so that they can readily be searched by any peer 102a-102n, a directory synchronization process is necessary. Applying this technique, it may be the responsibility of each peer 102a-102n in the network 100 to send their list of files they have available, at least periodically, along with any changes to that list as they occur, to the central directory 112.

Figure 4B:
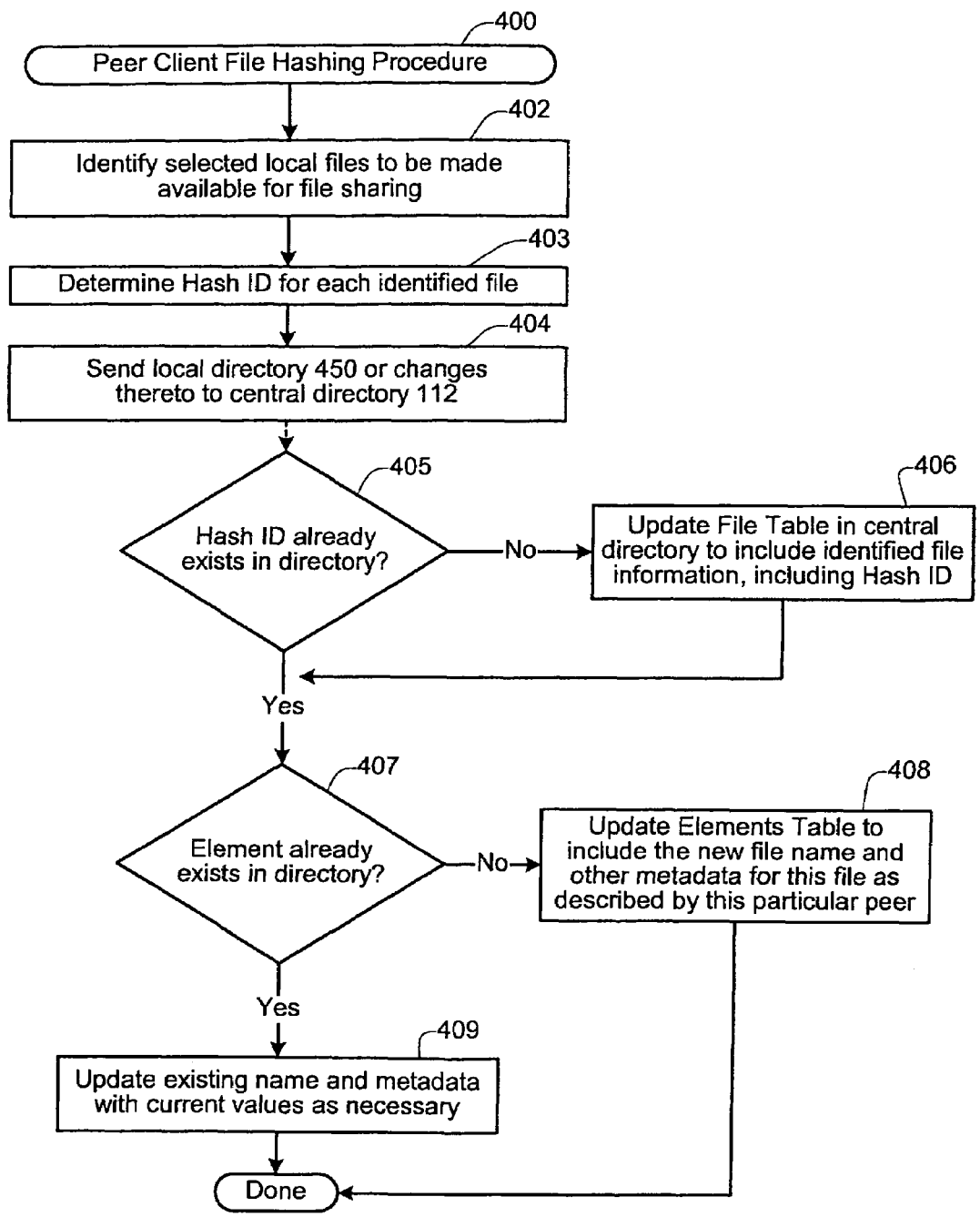
FIGS. 4B and 4C illustrates flow diagrams of the directory synchronization process between a local peer directory and a central directory in accordance with a specific embodiment of the present invention.

Referring now to one specific implementation, FIG. 4B shows the directory synchronization process between the local peer directory 450 and the central directory 112 commencing at operation 400. Initially at operation 402, the selected local files to be made available for file sharing are identified. The HASH code of each file to be shared (if it has not already been done previously or if a file has changed for any reason) is computed in operation 403. Once the HASH code for each new or changed file has been computed, the entire local directory 450, or alternatively only changes and additions to the local directory, are transmitted to the central server 110 in operation 404 via the internet 104. The central server 110 then proceeds to synchronize each individual file with the central directory 112. The first central directory operation 405 checks to see if a file with that particular HASH ID already exists in the file directory 310 of data directory structure 300 (FIG. 3A). If it doesn't, operation 406 is performed to add the new file to the central directory 112. In either case, the system now proceeds to operation 407, which is to check to see if a record exists in the elements table 320 for this particular file and user combination. If it does not, operation 408 is performed to add the filename, meta data, and peer ID to the elements table. If an element already existed for that user ID and file ID in the elements table 320, that record is checked for any required changes and updated as necessary. In any event, the new data coming from the peer 102a-102n takes precedence over corresponding existing data in the central directory 112.

Figure 4C:
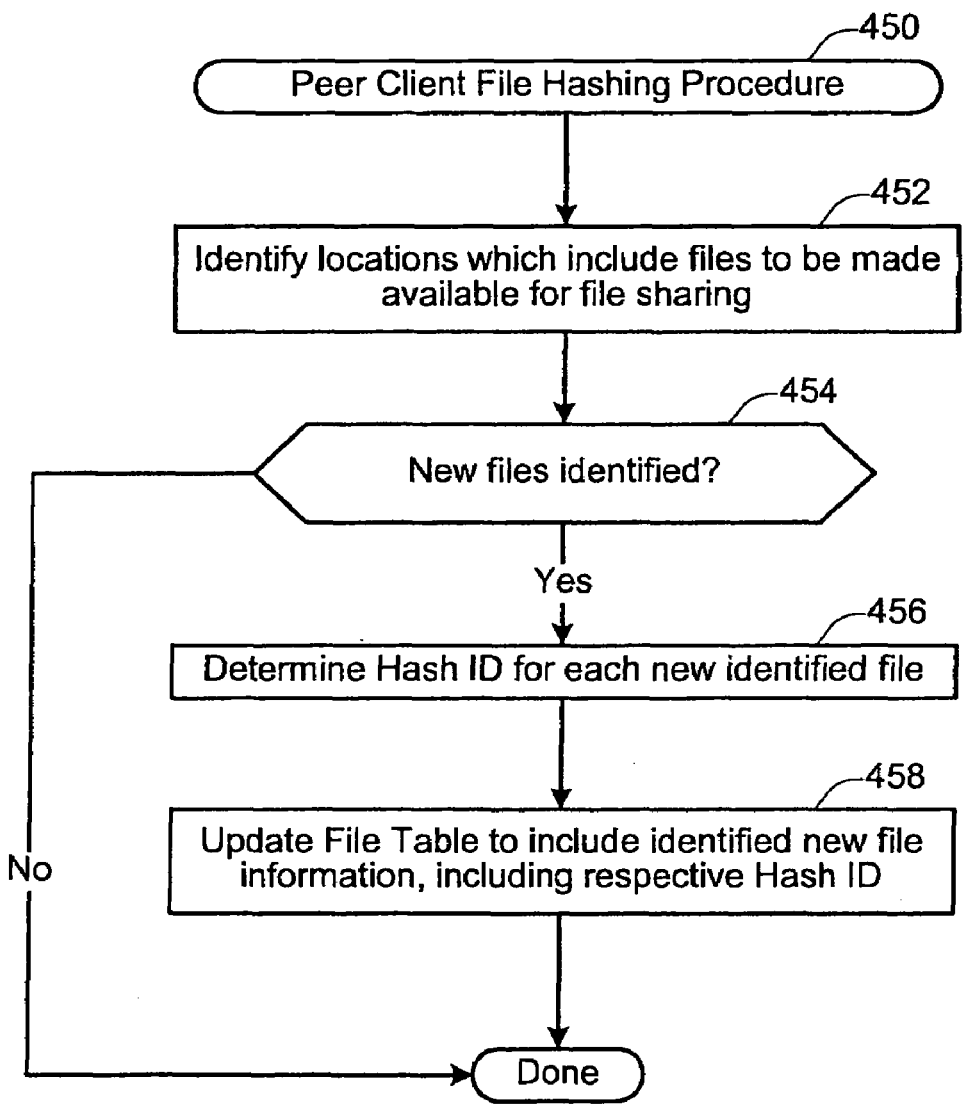

FIG. 4C further illustrates an alternative embodiment process of adding new files into the local directory 470. This file addition process may be performed whenever a new location (a file, several files, or a folder containing several files) is added to the list of locations available for file sharing or whenever a new file is added to an existing shared folder. Whenever a new file is identified in operation 474, its HASH code is immediately determined in operation 476. The local directory 450 is updated in operation 478 with the particular information for that file, including its filename, HASH ID, size, and location on the peer device.

Figure 5:
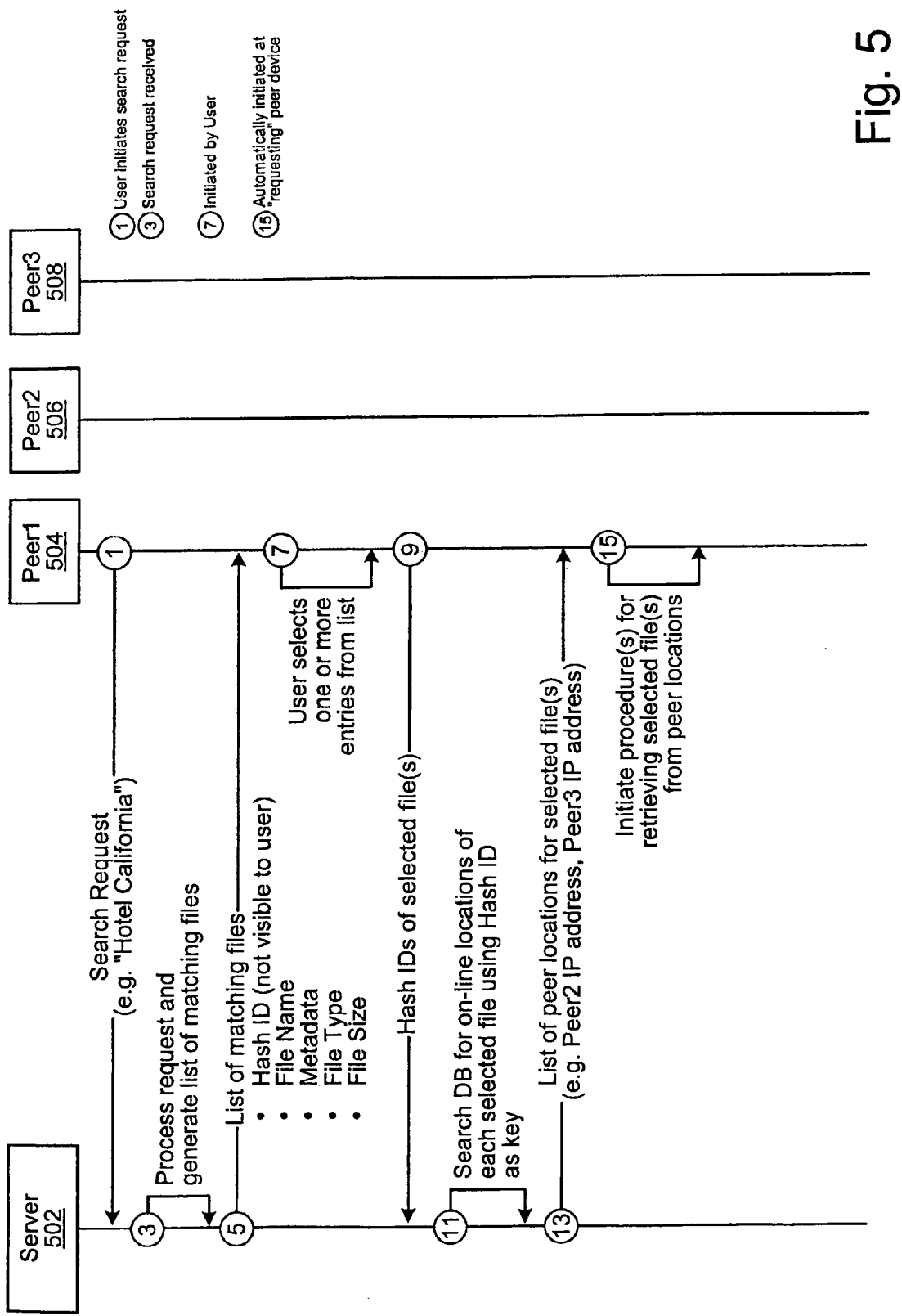
FIG. 5 illustrates a trace diagram of the technique for searching files in accordance with a specific embodiment of the present invention.

FIG. 5 illustrates the process of searching for files according to one specific implementation. When a requesting peer1 (504) searches for a fall or partial filename or a particular keyword, the peer software sends the search request to the central server 502 in operation (1). The central server 502 processes this request and generates a list of matching files at operation (3), returning it to the requesting peer1 (504) in operation (5). The peer1 (504) displays only the relevant information to the user, who then selects one or more files to retrieve in operation (7). The requesting peer1 (504) then sends the HASH ID of one or more files to be retrieved to the server 502 at operation (11), the server identifies zero, or one or more "on-line" locations (addresses) at which the requested file(s) may be found. The list of HASH Ids and matching locations is returned to the requesting peer1 (504) in operation (13). Finally, in operation (15), the requesting peer initiates the procedure to retrieve the selected file(s) from the locations provided by the server 502, the operations of which are described below.

In one embodiment, the returned list in operation (13) may be limited to a maximum number of locations for each file, since in practice a file can usually be reliably retrieved from a relatively small number of locations. In an alternative embodiment, the server 502 may have returned the possible locations of each file with the results of operation (5). This would be beneficial by virtue of saving the second query to the server in operation (9) but would be expensive since locations would have to be found and transmitted, even for files that are not ultimately desired. In addition, the locations an available file may change in the intervening time between the original search and the selection of particular files to retrieve.

Once a list of locations for a file has been identified, the requesting peer1 (504) can choose a location from the list (assuming there is more than one location) using any number of different techniques. The requesting peer1 (504) can just pick the first location from the list, pick a location at random, or use some heuristic algorithm to find the "best" location to retrieve from. This may involve "pinging" each location to determine its relative distance on the network 100 from the requesting peer1 (504), or requesting a 1024 byte packet from each location to see which one can deliver bytes fastest. Such heuristics may also be useful to see which peers the requesting peer can complete a connection to. It may be impractical for the server 502 to know which peers can communicate efficiently with what other peers at any given time, since the server may not have sufficient knowledge of the topology of the network 100 or of the traffic loads that exist on it at any particular time.

Figure 6A:
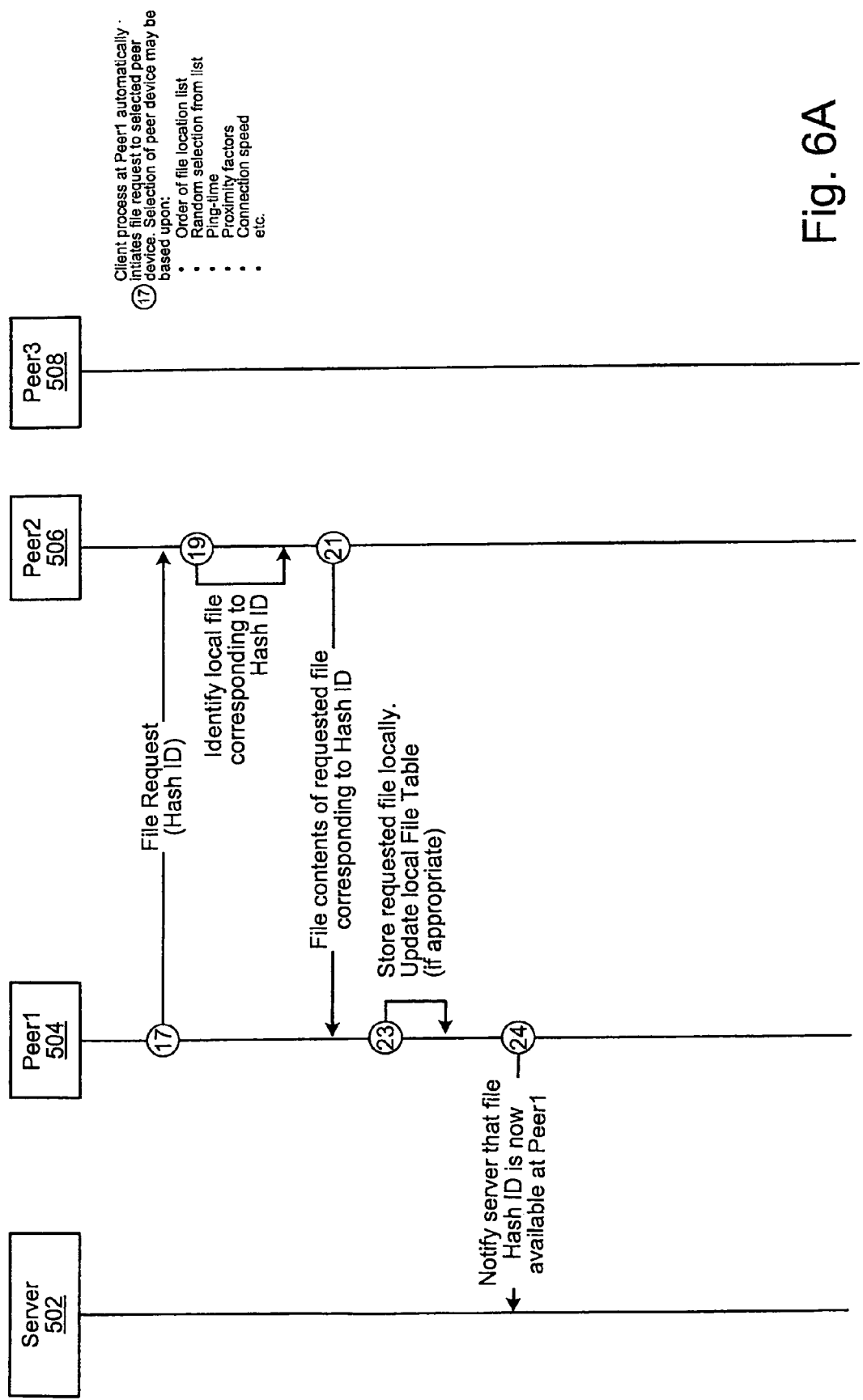

In FIG. 6A, in accordance with one specific embodiment, once the requesting peer1 (504) has chosen a first location to start retrieving the file from (e.g., peer2 (506) in this case), the requesting peer1 makes a request at operation (17) to peer2 (506) for a file that has the desired HASH ID. Peer2 (506) then identifies which file in its local directory corresponds to the desired HASH ID, for example, by performing a lookup or search in its local directory 450 at operation (19). If the requesting peer1 (504) and peer2 (506) can reliably communicate, peer2 transmits the contents of the requested file to the requesting peer1 at operation (21). Once the file has been successfully retrieved, the file is stored locally in operation (23).

The name and meta data attached to the file at this point will be that which was originally selected in the search results in operation (5) of FIG. 5. This name and meta data may not necessarily be the same as the name and meta data attached to the file by peer2 (506). Finally, in operation (24), the requesting peer1 notifies the server 502 that it has a copy of the file, in this way potentially becoming a fulfilling peer for a subsequent request for this same file. Furthermore, this final message from the requesting peer can be used by the server to log successful file transfers, helping operators monitor the efficiency of the network 100.

In some situations, such as the presence of firewalls, proxy servers, or other network devices, or the fact that the fulfilling peer is no longer online, the first fulfilling peer2 (506) may not answer a request for a file. FIG. 6B illustrates this situation, in one specific implementation. If the fulfilling peer2 (506) does not respond within a nominal timeout interval, the requesting peer1 (504) will select the next location Peer3 (508) from the list of available locations determined in operation (13) of FIG. 5, using any one of a number of heuristic algorithms to do so. Assuming in this case that Peer1 (504) and Peer3 (508) can communicate, Peer1 will send a request for the file with the specified HASH ID to Peer3 in operation (27). Next, Peer3 will find that file on the local peer device in operation (29), and will transmit the contents of the requested file to Peer 1 in operation (31). Once the file has been successfully retrieved, the file is stored locally in operation (33). Finally, in operation (34), the requesting peer (504) will notify the server 502 that it now has a copy of the file.

Figure 6C:
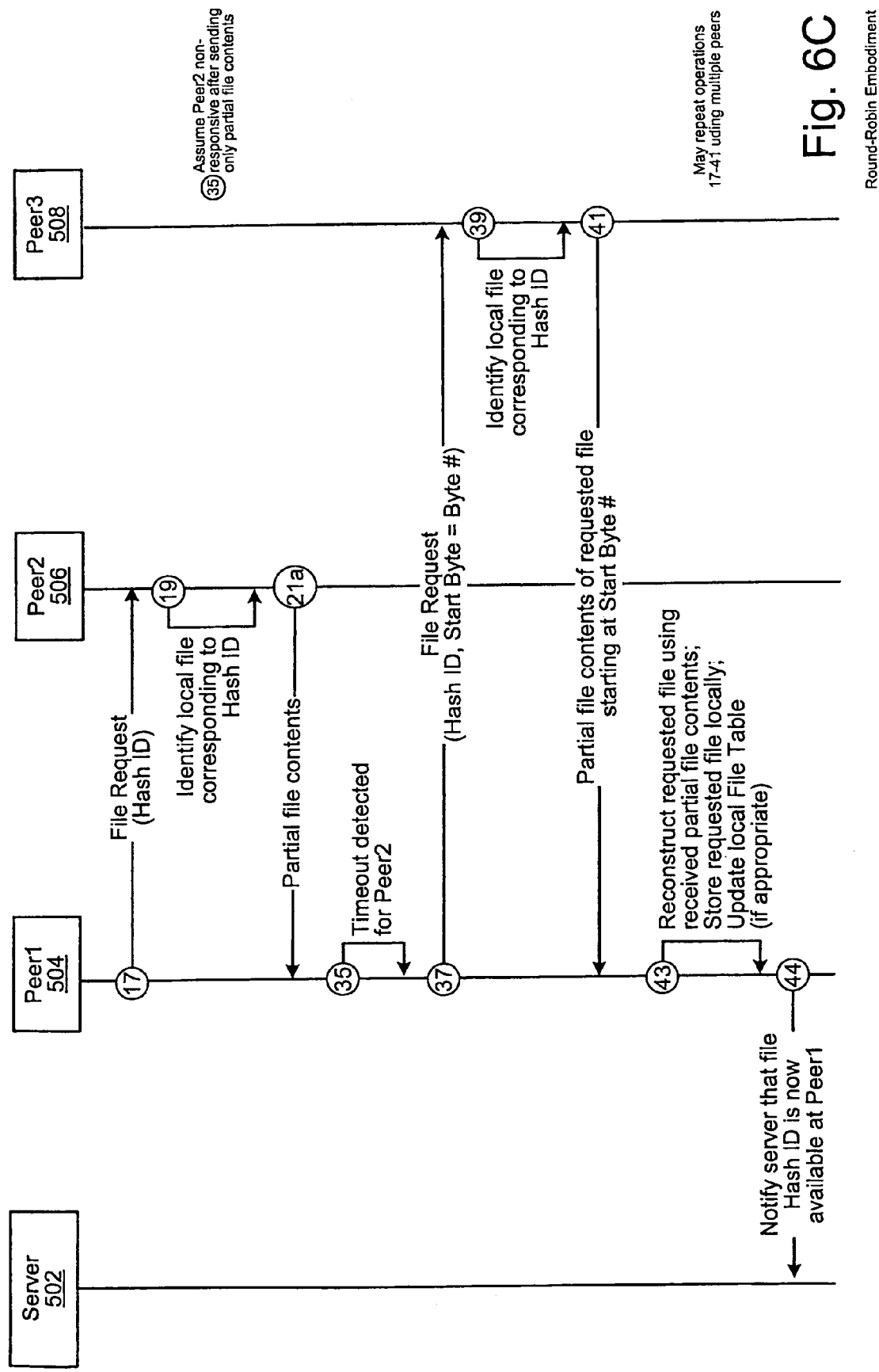

According to one specific implementation, the retrieving of a file from one fulfilling peer that is interrupted for any reason may be resumed from another peer that is online and that has that file. FIG. 6C illustrates the situation where a file may be partially retrieved from the first fulfilling peer2 (506) in the list of locations determined at operation (13) of FIG. 5. After a time, the first fulfilling Peer2 (506) is no longer providing the contents of the file to the requesting peer1 (504) at operation (21a). The requesting Peer1 (504) detects a timeout in operation (35)1 and then decides to proceed with retrieving the remainder of the file from a second fulfilling Peer3 (508). The requesting peer1 (504) in this case makes a request in operation (37) for the file with HASH ID starting at a position one byte greater than the amount of the file retrieved so far from the next peer in the list of available locations; in this case Peer3 (508).

It is crucial that the file contents on the first fulfilling Peer2 (506) and the second fulfilling Peer3 (508) corresponding to HASH ID be identical in every respect, since otherwise these parts of files may not fit together correctly and result in a damaged or corrupted final file. This is why it is essential to pick a HASH function that will uniquely create a unique HASH code from a file's contents.

Once the second fulfilling Peer3 (508) identifies which file in its local directory corresponds to the desired HASH ID at operation (39), the new fulfilling Peer3 (508) returns the remainder of the file to the requesting peer1 (504) in operation (41). The application in the requesting peer1 (504) then joins the two chunks of the file together in operation (43) and stores the file locally. In operation (44), the requesting peer1 (504) will notify and update the central directory 112 of the server 502 that it now has a copy of the file.

In an alternative embodiment, when the relative ability of multiple peers to deliver files is not known, it can be advantageous to retrieve different parts of a single file from multiple peers 102a-102n simultaneously. This may be particularly true if the requesting peer has a faster connection than most of the fulfilling peers since the file can be retrieved faster than any single fulfilling peer can deliver it.

Figure 7:
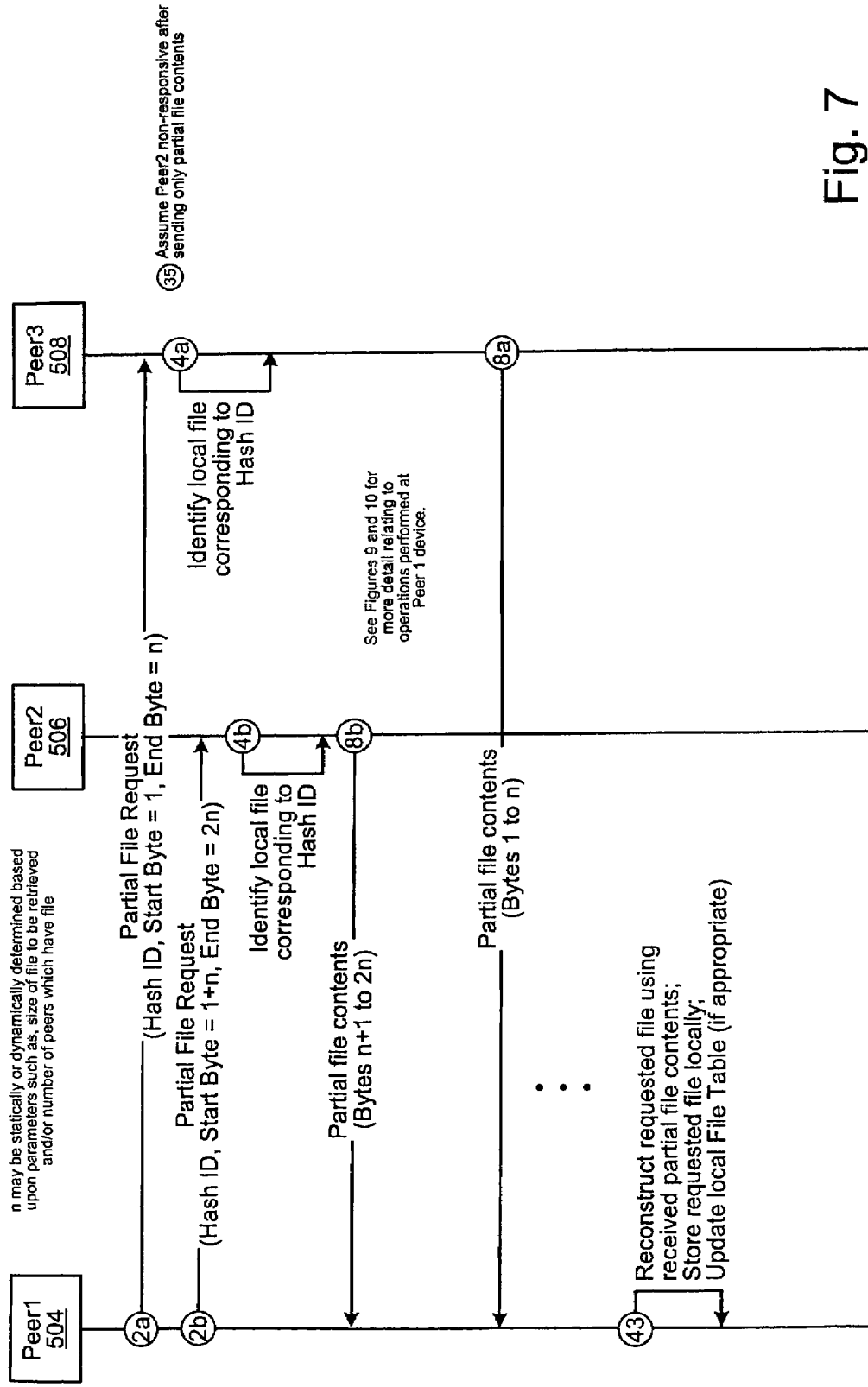
FIG. 7 shows a trace diagram of another file retrieving technique from multiple peers in accordance with an alternative embodiment of the present invention.

According to one specific implementation shown in FIG. 7, the requesting peer1 (504) requests different "chunks" of the desired file from two different fulfilling peers—(506) and (508). The partial file requests in operation (2a) and operation (2b) takes the form of the HASH ID of the desired file, the starting position in the file, and the end position in the file. In this example, the requesting peer1 (504) may request for chunks of size "n" bytes. The chunk size "n" may be statically or dynamically determined based upon parameters such as, size of file to be retrieved and/or number of peers which currently have the file available. The first partial request in operation (2a) may be for the first "n" bytes goes to peer3 (508), starting a byte no. 1 and ending at byte no. n. The second partial request in operation (2b) may be for the second "n" bytes goes to peer2 (506), starting a byte no. n+1 and ending at byte no. 2n. Each fulfilling peer returns the requested part of the file to the requesting peer1 (504) in operations (8a) and (8b). In operation 43, the requesting peer1 (504) reassembles the chunks of the file received from each peer in the right order into the actual file. The requesting peer1 (504) will then notify and update the central directory 112 of the server 502 that it now has a copy of the file which is not shown.

Figure 8:
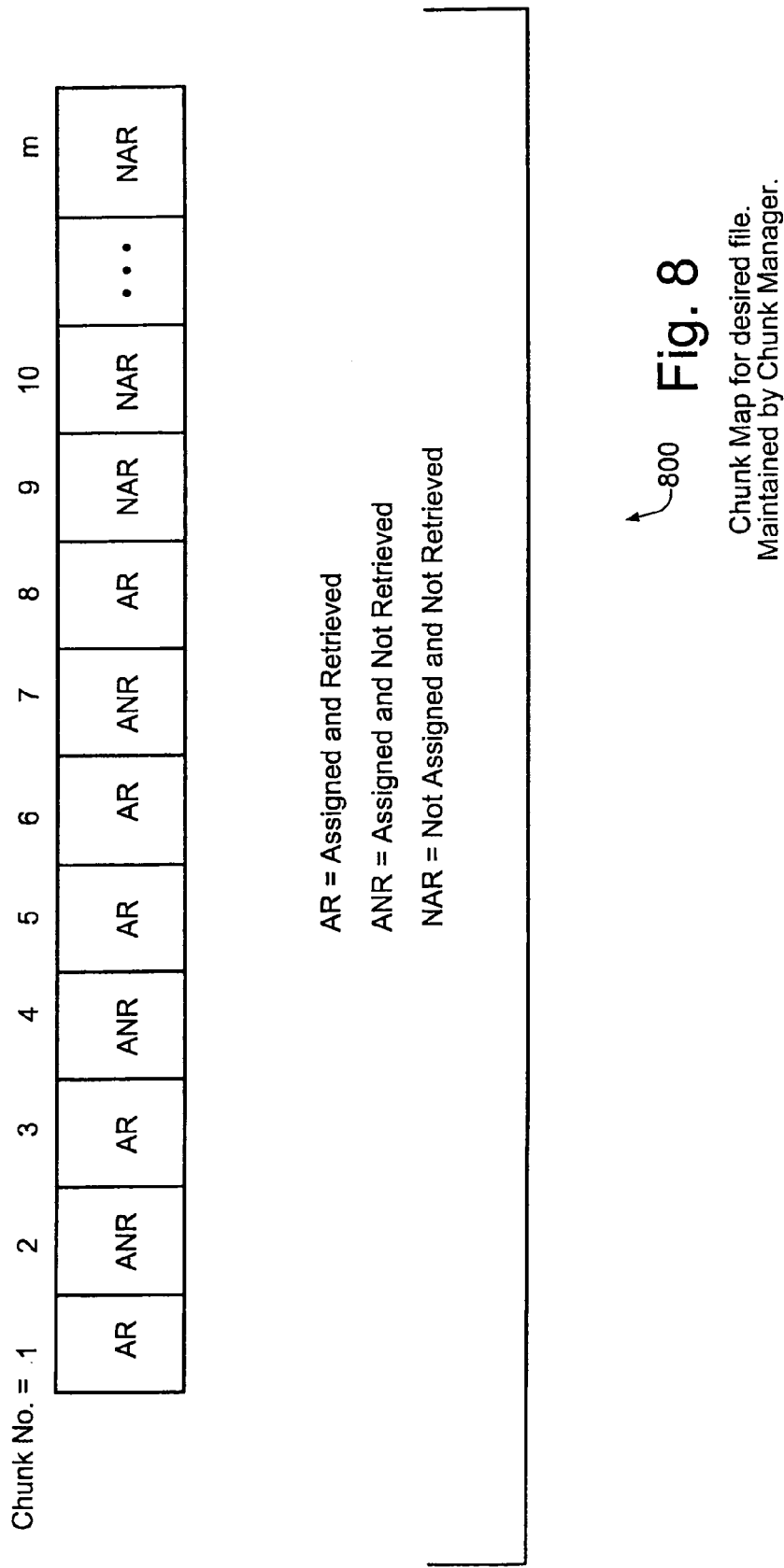
FIG. 8 shows a block diagram of a chunk map for the management of the retrieval of "chunks" of a file for the file retrieving technique in accordance with the alternative embodiment of the present invention.

A file may be retrieved from multiple fulfilling peers in parts or "chunks." According to one specific embodiment, it may be the responsibility of the requesting peer to keep track of what chunks have already been retrieved, what chunks are currently being retrieved, and what chunks remain to be retrieved. FIG. 8 illustrates a "chunk map" 800 constructed by a "chunk manager" tool or application in which a file has been divided into "m" chunks. Each chunk will typically have the same size, for example "n" bytes, except for the last chunk which may have an odd size since there may be no guarantee that the requested file can be divided into a number of equal sized chunks. According to this specific embodiment, each chunk exists in one of three possible states: AR=Assigned and Retrieved; ANR=Assigned and Not Retrieved; and NAR=Not Assigned and Not Retrieved. The chunk manager uses this state information to determine which chunks are to be retrieve next. The file is known to have been completely retrieved when every chunk is in the "AR" state.

In one specific example, a file whose size is 1.45 MB, for instance, is being requested. If the system has been configured to use a value of n=100 kb, there will be m=15 chunks, each of size 100 kb, except for the $15^{th}$ chunk, whose size will be 50 kb.

According to one specific implementation, the chunk manager can assign the retrieval of any one chunk of a file to a worker thread (i.e. Peer1-PeerN). Multiple worker threads may be running in parallel, each retrieving a distinct chunk of the file. The chunk manager may employ a variety of techniques to assign chunks to retrieve and peers to retrieve from to different threads. In one embodiment, the chunk manager assigns "p" chunks sequentially to "p" individual threads. Typically, $p \leq m$, the number of chunks available, although an alternative may be to use more threads than there are chunks and to simply terminate the surplus threads that are not finished when the entire file has been retrieved. The number of threads that can be run in parallel may be constrained by system resources available on the peer device, by operating system constraints, or for any other reason.

Figure 9:
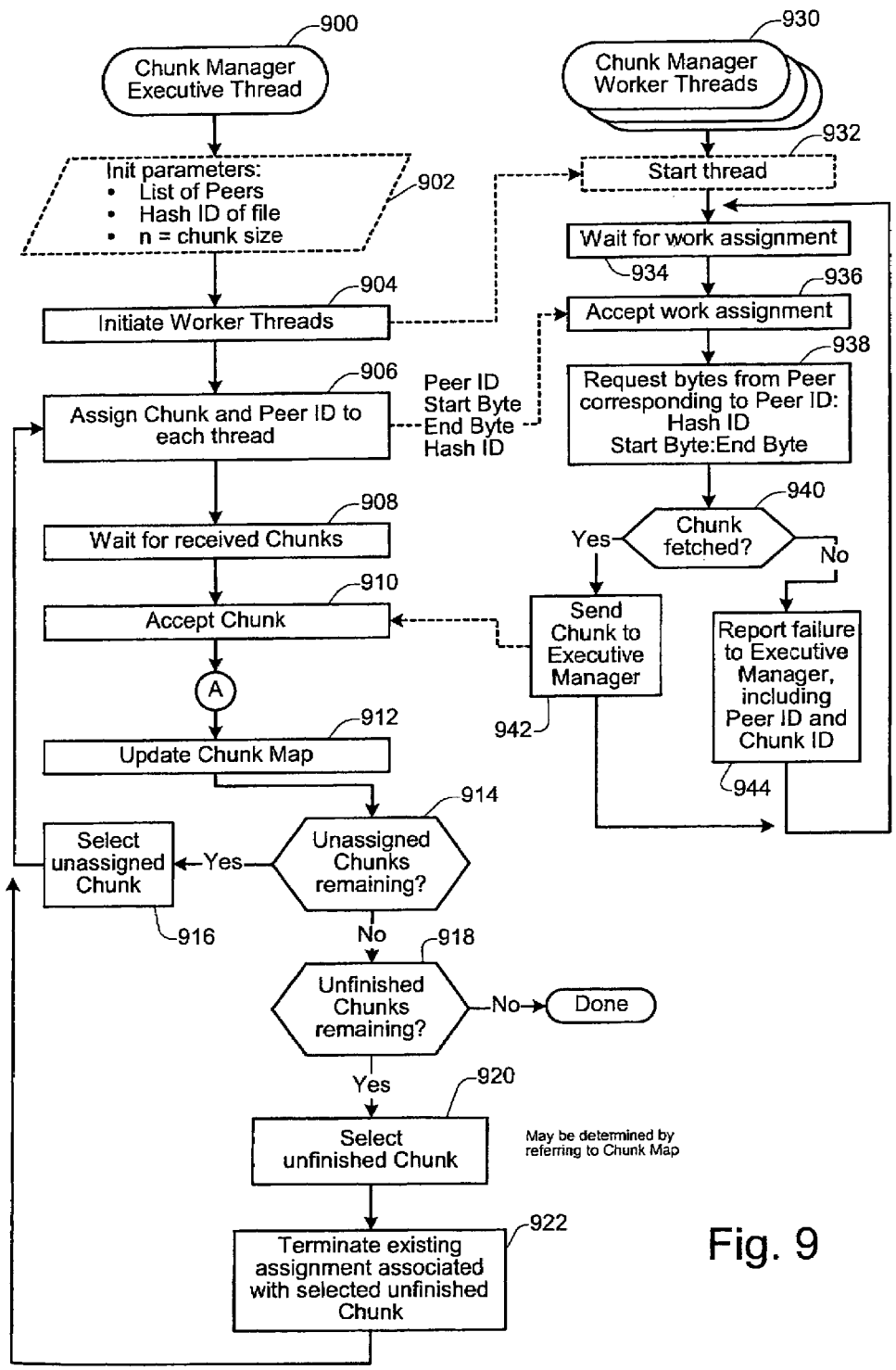
FIG. 9 illustrates a flow diagram of the chunk management technique across multiple worker threads for the file retrieving technique in accordance with the alternative embodiment of the present invention.

FIG. 9 illustrates one specific embodiment where a chunk manager executive thread at operation (900) manages the efforts of multiple worker threads. The executive thread starts with initial parameters at operation (902) including a list of peers that have the file with HASH ID that is to be retrieved, as well as the chunk size "n" to be used in retrieving. Alternatively, the chunk manager may compute its own value of n based on the number of peers available and the size of the file.

The executive thread's first task at operation (904) is to launch a number "p" of worker threads. Each worker thread starts up in operation (932) and waits for an assignment in operation (934).

The executive thread assigns a chunk to each available worker thread in operation (906). Each unit of work may be characterized by the HASH ID of the file to be retrieved, the peer to retrieve it from, and the start and end positions in the file. Each worker thread accepts a work assignment in operation (936), and then makes a request to the assigned peer for the assigned chunk in operation (938). This request includes the HASH ID of the file and the start and end positions in the file. Meanwhile, the executive thread waits for chunks to be received in operation (908).

A query is performed at operation (940) about whether or not the desired chunk has been completely received. If "YES", when a worker thread has completely received a chunk, it sends that chunk or preferably, a reference to the location of the chunk in memory or on a storage device, to the chunk manager in operation (942). The chunk manager accepts the chunk at operation (910), and updates its chunk map 800, marking the received chunk as having state "AR" in operation (912).

If the query performed at operation (940) is answered with a "NO", the failure is reported to the executive manager at operation (944). This reported information will include the HASH ID of the file to be retrieved, the peer to retrieve it from, and the start and end positions in the file of the chunk not retrieved.

At this point, regardless of the query at operation (940), the worker thread that has just finished returns to operation 934 and waits for another assignment. The executive thread examines its updated chunk map in operation 914 to see if there are any unassigned chunks (state "NAR") remaining. If there are, it selects one unassigned chunks in operation (916) and assigns it to a free worker thread in operation (906).

If there are no unassigned chunks, the executive thread may decide to select an existing assigned, but not yet fully received "ANR" chunk, for reassignment in operation (920). This decision may be made based upon a variety of factors, including the current rate of retrieving of unfinished chunks, the availability of additional worker threads or peers, or the relative retrieve speed of available peers. If an assigned, but unfinished chunk is selected for reassignment, the existing worker thread assigned to that chunk has its assignment terminated and becomes available for reassignment at operation (922). The chunk it was working on is now marked as "NAR" and is ready for reassignment in operation (906).

In one specific embodiment, a specific peer may be attached to a specific worker thread for the duration of the process. Worker threads that finish sooner may get new work assigned to them, with that new work being targeted to peers that are faster at delivering chunks of the file. Should a peer fail to deliver a chunk in a timely manner, it may be removed from the list of available peers and the thread may request a new peer to interact with. The delivery speed of various peers may vary over time, so that what was a fast peer at the beginning of the process becomes a slow peer towards the end or vice-versa. Since new work tends to go to threads that are finishing their work fastest, the system self-optimizes the retrieve to deliver the file as fast as possible.

By way of example, in the previously discussed file of FIG. 8 where the 1.45 MB file is divided into m=fifteen (15) chunks of n=100 kb (the $15^{th}$ chunk being 50 kb), ten (10) peers are online and have the file with HASH ID available. The executive manager decides to use p=eight (8) worker threads to retrieve the file. If every chunk retrieved is successful and is performed in the same amount of time, each thread will retrieve two 100 kb chunks, except for the $8^{th}$ thread, which will only retrieve one 100 kb chunk, and for the $7^{th}$ thread, which will retrieve a 100 kb chunk followed by a 50 kb chunk.

In practice, some threads will be assigned to unresponsive peers and will fail to retrieve their chunks the first time. The executive thread may mark these peers as unresponsive and assign new peers to the available threads. Furthermore, some peers may be much faster than others at retrieving chunks. In that case, they will become available for retrieving new chunks earlier, the result being that one thread may retrieve five (5) or six (6) chunks while the remainder only retrieve one or two.

Figure 10:
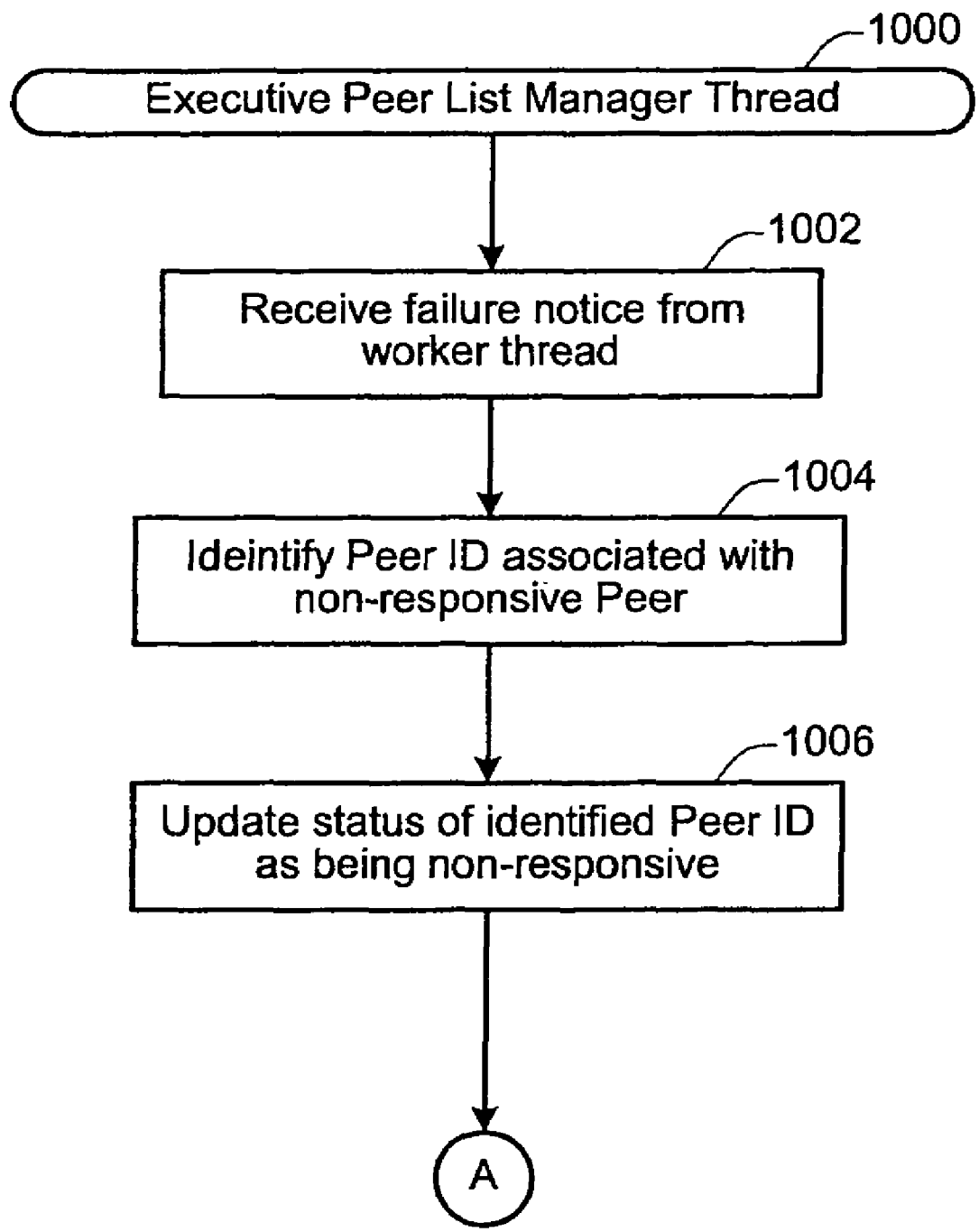
FIG. 10 illustrates a flow diagram of the chunk management technique when an unresponsive peer for the file retrieving technique in accordance with the alternative embodiment of the present invention.

Referring now to FIG. 10, one specific embodiment of a possible process for dealing with peers that fail to respond for chunks of a file is illustrated. The executive thread receives a failure notice from a worker thread in operation (1002). It then sets the measured speed of the corresponding peer to zero (0) in operation (1004). Subsequent peer assignments may use a ranking of measured speeds to pick the fastest available peers rather than the slower, or non-responsive ones. According to a specific embodiment, each peer may be assigned an average or nominal speed prior to the start of file retrieving. The speed of each peer would then be set to the actual speed as chunks are actually delivered. Since delivery speed may vary on a minute-by-minute basis, the most recent measurement of peer speed may be deemed to be authoritative. At operation (1006) the status of identified peers as being non-responsive are updated.

Figure 12:
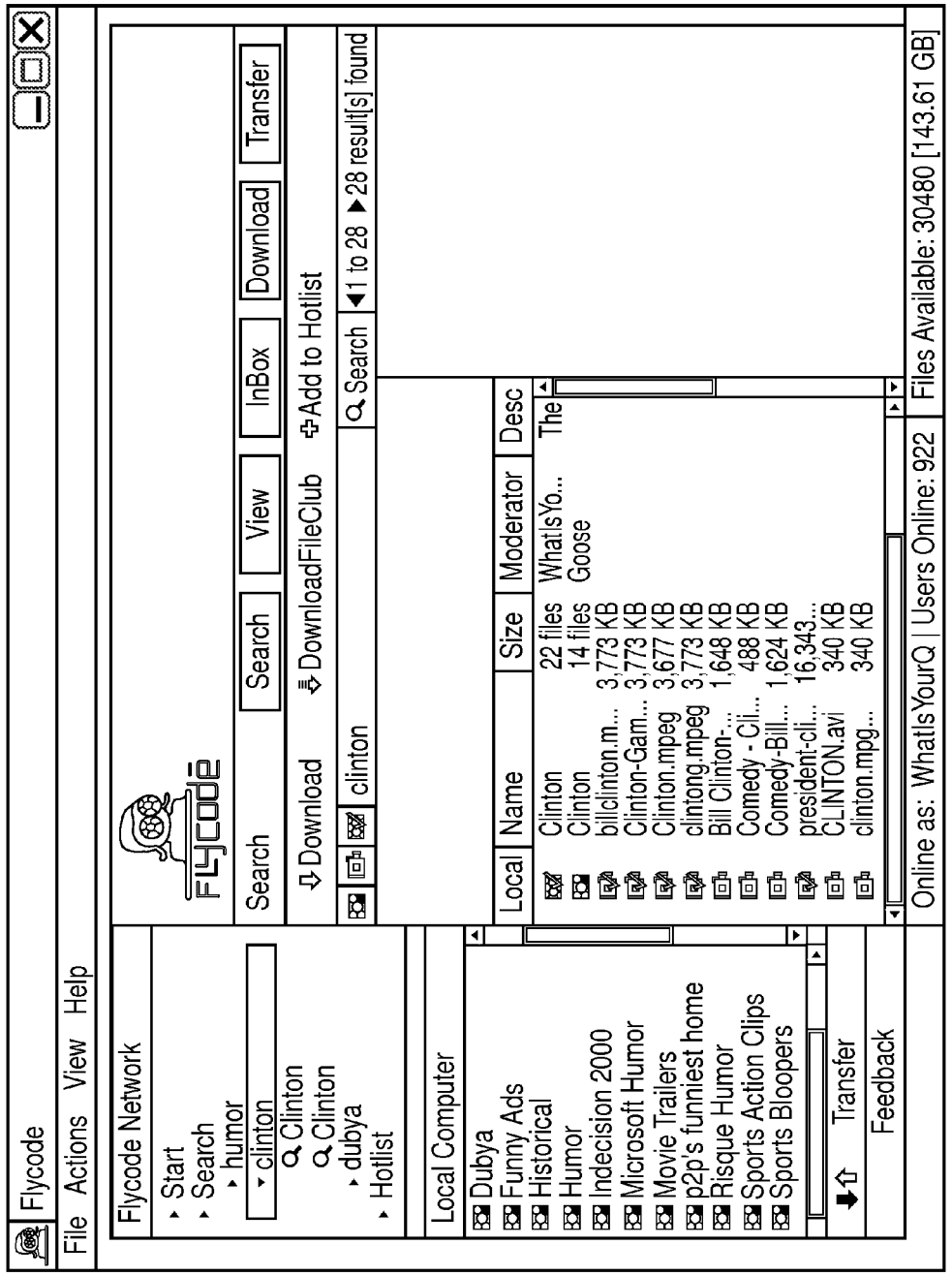
FIG. 12 is a diagram of an example of a screen shot illustrating a user interface on a peer device in accordance with a specific embodiment of the present invention.

FIG. 12 illustrates one example of a user interface 1200 on the peer device according to a specific embodiment of the present invention. The user interface, for instance, may be implemented as an application running on the Microsoft Windows operating system.

Figure 13:
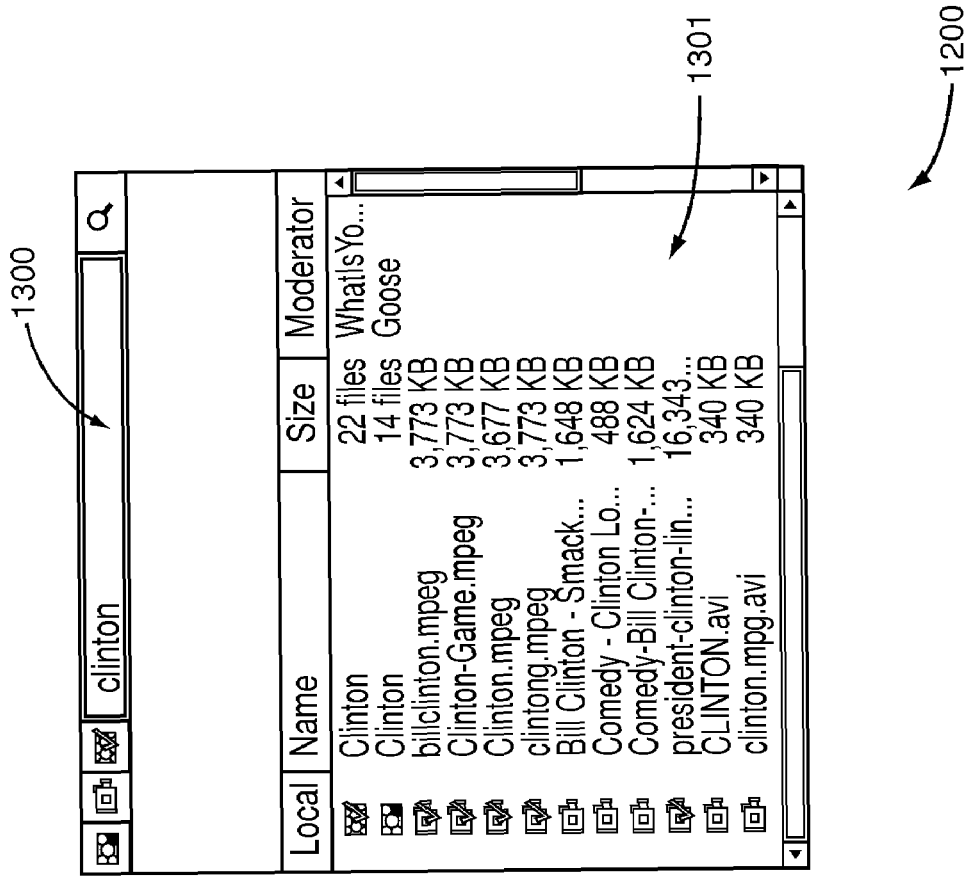
FIG. 13 is a diagram of another example of a screen shot illustrating a user interface showing a search input field in accordance with a specific embodiment of the present invention.

In one example, as viewed in FIG. 13, the user interface 1200 includes a search input field 1300 where the user can search for files. In this example the search term "clinton" is entered in field 1300. Files that are found are displayed in a search results list 1301.

Figure 14:
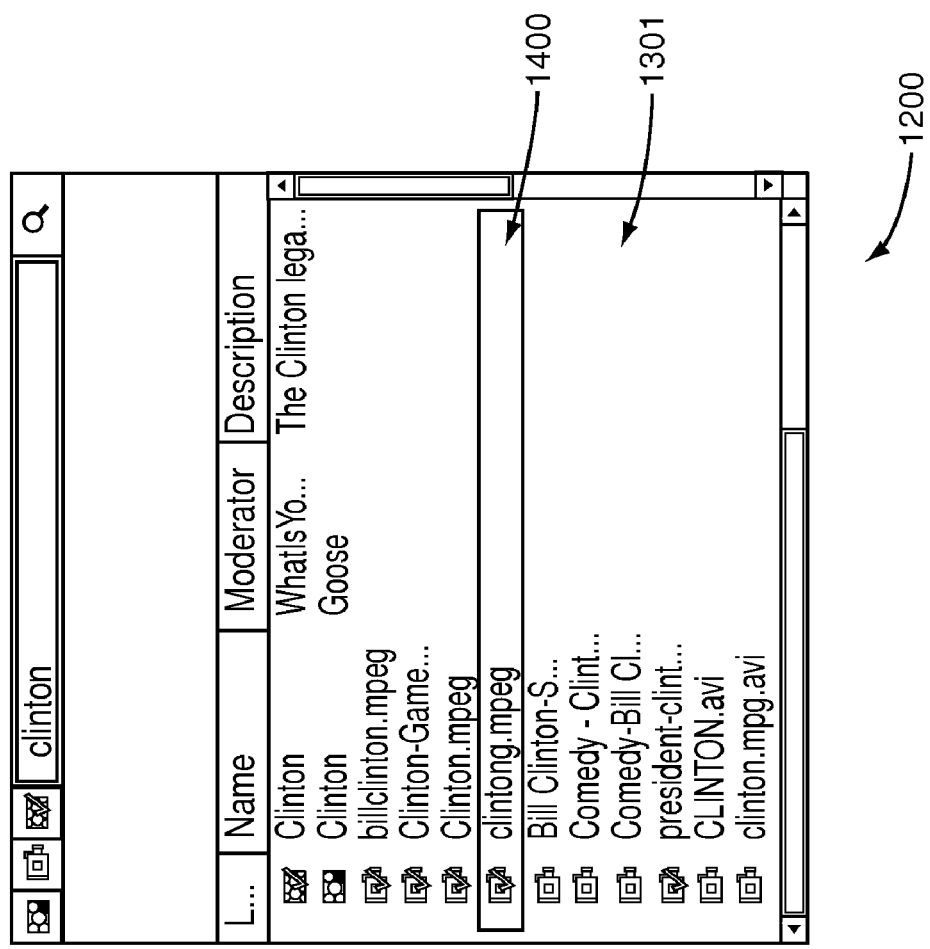
FIG. 14 is a diagram of the example of a screen shot of FIG. 13 illustrating a selection of the search input field in accordance with a specific embodiment of the present invention.

The user can then select one or more files from the list 1301 of search results, as shown in FIG. 14, to retrieve from other peers. In this instance, the mpeg file "clintong.mpeg" 1400 is highlighted.

It will be appreciated that the technique of the present invention provides improved peer-to-peer networking technology for enabling faster and more reliable downloads, using multiple peers in a round-robin or simultaneous retrieving mode, and/or being able to resume failed downloads from different peers. According to a specific embodiment, at least a portion of these features may be implemented by identifying files based on their contents rather than their file names. In this way it is possible to identify and retrieve file content from one or more identical files stored in the peer-to-peer network which have different file names and/or other metadata descriptors.

According to a specific embodiment, the peer-to-peer network of the present invention includes a central directory, like Napster, but unlike Gnutella which uses a distributed directory. However, it will be appreciated that the technique of the present invention may be applied to both to central directory systems as well as peer-to-peer, distributed directory systems.

Other Embodiments

Generally, the peer-to-peer file sharing techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the peer-to-peer file sharing technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. Specific examples of such network devices include routers and switches. For example, the technique of the present invention may be implemented on specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the peer-to-peer file sharing technique of this invention may be implemented on a general-purpose network host machine such as a personal computer or workstation. Further, the invention may be at least partially implemented on a card (e.g., an interface card) for a network device or a general-purpose computing device.

Figure 11:
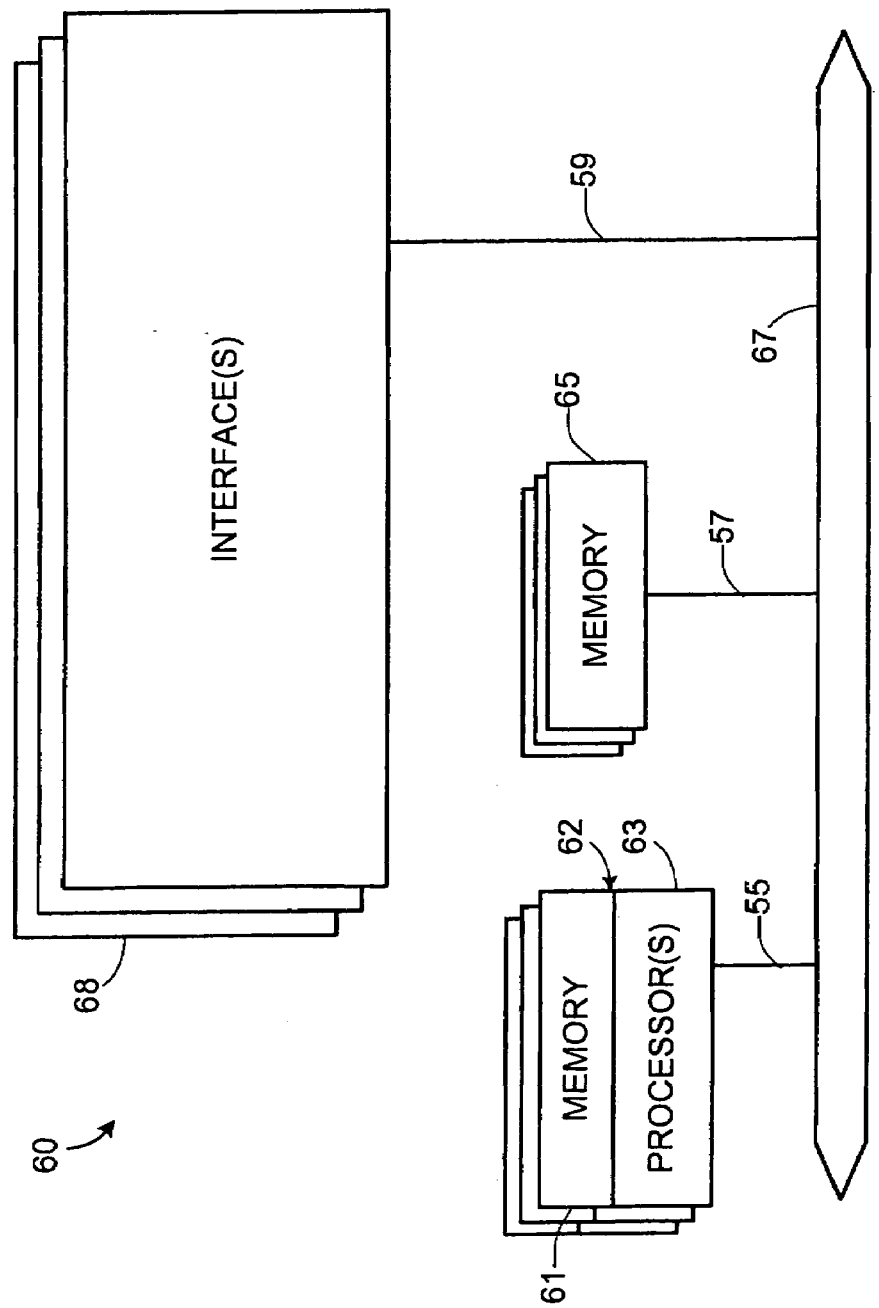
FIG. 11 shows a specific embodiment of a peer network device 60 which may be used for implementing the technique of the present invention.

Referring now to FIG. 11, a network device 60 suitable for implementing the peer-to-peer file sharing techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a server device, the CPU 62 may be responsible for analyzing packets, encapsulating packets, forwarding packets to appropriate network devices, processing file search requests, maintaining shared file information across the peer-to-peer network, etc. Alternatively, when configured as a peer network device, the CPU 62 may be responsible for initiating file search requests, retrieving file content information from peer devices, performing hash coding operations on selected files, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as nonvolatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 11 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the peer-to-peer file sharing techniques described herein. The program instructions may control the operation of an operating system and/or one or more applications, for example. The memory or memories may also be configured to include.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as read- only memory devices (ROM) and random access memory (RAM). Examples of program instructions include both machine code, such as produced by a compiler, and files containing higher level code that may be executed by the computer using an interpreter.

Additional embodiments of the present invention are described in Appendix C and Appendix D of U.S. application Ser. No. 09/883,064, each of which is incorporated herein by reference in its entirety for all purposes. Appendix C is entitled, "FLYCODE DATABASE SPECIFICATION", and Appendix D is entitled, "FLYCODE VERSION 2 ARCHITECTURE—SPECIFICATION".

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

The invention claimed is:

1. A method for accessing information in a peer-to-peer network, the peer-to-peer network including a plurality of peer devices and a database system accessible by at least a portion of the plurality of peer devices, each peer device of the plurality of peer devices being configured to store information files, and further being configured to share file content from selected information files with at least a portion of other peer devices in the peer-to-peer network, wherein each shared file in the peer-to-peer network has a respective HASH ID associated therewith relating to the file content of each shared file, the HASH ID being different from a respective filename associated with each shared file, the method comprising:

identifying a first peer device which has been identified as storing a first information file associated with a first HASH ID;

identifying a second peer device which has been identified as storing a second information file associated with the first HASH ID;

transmitting a first message including the first HASH ID to the first peer device requesting a first portion of file content of the first information file from the first peer device;

transmitting a second message including the first HASH ID to the second peer device requesting a second portion of file content of the second information file from the second peer device;

detecting a failure in a file transfer process associated with the first peer device;

identifying a network address corresponding to a third peer device which has been identified as storing a third information file associated with the first HASH ID; and transmitting a third message to the third peer device, the third message corresponding to a request to retrieve the first portion of file content from the third information file.

2. The method of claim 1 wherein the first and second messages are initiated at a same time.

3. The method of claim 1 wherein the requesting of the first portion of file content from the first peer device occurs concurrently with the requesting of the second portion of file content from the second peer device.

4. The method of claim 1 further comprising:

receiving the first portion of file content from the first peer device;

receiving the second portion of file content from the second peer device;

generating the third information file which includes the first and second portion of file content, wherein the file content of the third information file is identical to the file content of the first information file.

5. The method of claim 1 wherein the first portion of file content corresponds to a first chunk of bytes 1 to N of the first information file; and wherein the second portion of file content corresponds to a second chunk of bytes N+1 to 2N of the second information file.

6. A system for accessing information in a peer-to-peer network, the peer-to-peer network including a plurality of peer devices and a database system accessible by at least a portion of the plurality of peer devices, each peer device of the plurality of peer devices being configured to store information files, and further being configured to share file content from selected information files with at least a portion of other peer devices in the peer-to-peer network, wherein each shared file in the peer-to-peer network has a respective HASH ID associated therewith relating to the file content of each shared file, the HASH ID being different from a respective filename associated with each shared file, the system comprising:

at least one CPU;

memory; and at least one interface for communicating with other devices in the peer-to-peer network;

the at least one CPU adapted to:

identify a first peer device which has been identified as storing a first information file associated with a first HASH ID;

identify a second peer device which has been identified as storing a second information file associated with the first HASH ID;

transmit a first message including the first HASH ID to the first peer device to request a first portion of file content of the first information file from the first peer device;

transmit a second message including the first HASH ID to the second peer device to request a second portion of file content of the second information file from the second peer device;

detect a failure in a file transfer process associated with the first peer device;

identify a network address corresponding to a third peer device which has been identified as storing a third information file associated with the first HASH ID; and transmit a third message to the third peer device, the third message corresponding to a request to retrieve the first portion of file content from the third information file.

7. The system of claim 6 wherein the first and second messages are initiated at a same time.

8. The system of claim 6 wherein the request of the first portion of file content from the first peer device occurs concurrently with the request of the second portion of file content from the second peer device.

9. The system of claim 6 wherein the CPU is further adapted to:

receive the first portion of file content from the first peer device;

receive the second portion of file content from the second peer device; and generate the third information file which includes the first and second portion of file content, wherein the file content of the third information file is identical to the file content of the first information file.

10. The system of claim 6 wherein the first portion of file content corresponds to a first chunk of bytes 1 to N of the first information file; and wherein the second portion of file content corresponds to a second chunk of bytes N+1 to 2N of the second information file.

11. A computer program product for accessing information in a peer-to-peer network, the peer-to-peer network including a plurality of peer devices and a database system accessible by at least a portion of the plurality of peer devices, each peer device of the plurality of peer devices being configured to store information files, and further being configured to share file content from selected information files with at least a portion of other peer devices in the peer-to-peer network, wherein each shared file in the peer-to-peer network has a respective HASH ID associated therewith relating to the file content of each shared file, the HASH ID being different from a respective filename associated with each shared file, the computer program product comprising:

a non-transitory computer readable storage medium having computer readable code embodied therein, the computer readable code comprising computer code for:

identifying a first peer device which has been identified as storing a first information file associated with a first HASH ID;

identifying a second peer device which has been identified as storing a second information file associated with the first HASH ID;

transmitting a first message including the first HASH ID to the first peer device requesting a first portion of file content of the first information file from the first peer device;

transmitting a second message including the first HASH ID to the second peer device requesting a second portion of file content of the second information file from the second peer device;

detecting a failure in a file transfer process associated with the first peer device;

identifying a network address corresponding to a third peer device which has been identified as storing a third information file associated with the first HASH ID; and transmitting a third message to the third peer device, the third message corresponding to a request to retrieve the first portion of file content from the third information file.

12. The computer program product of claim 11 wherein the first and second messages are initiated at a same time.

13. The computer program product of claim 11 wherein the request of the first portion of file content from the first peer device occurs concurrently with the request of the second portion of file content from the second peer device.

14. The computer program product of claim 11 further comprising computer code for:

receiving the first portion of file content from the first peer device;

receiving the second portion of file content from the second peer device; and generating the third information file which includes the first and second portion of file content, wherein the file content of the third information file is identical to the file content of the first information file.

15. The computer program product of claim 11 wherein the first portion of file content corresponds to a first chunk of bytes 1 to N of the first information file; and wherein the second portion of file content corresponds to a second chunk of bytes N+1 to 2N of the second information file.

* * * * *